INTERCOMMUNICATION TELEPHONE SYSTEM
Filed Oct. 19, 1949
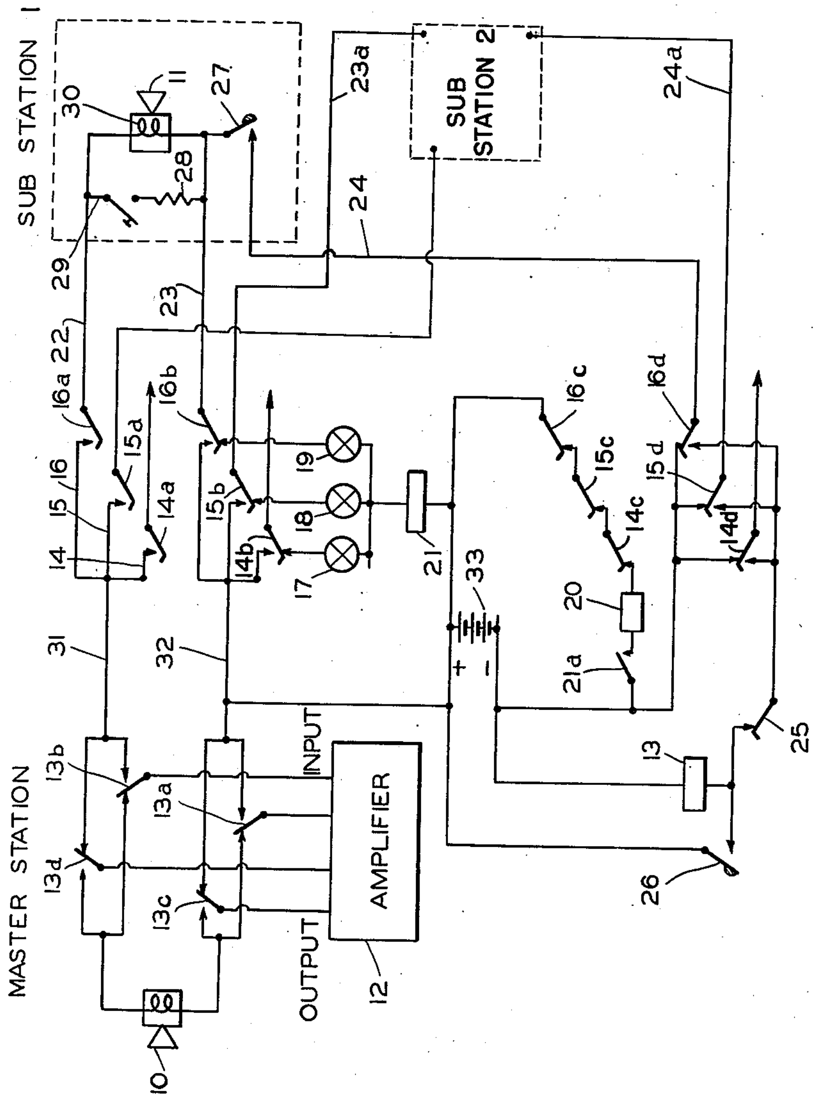
INVENTOR.
EDGAR IVENS
BY Paul Kolisch
ATTORNEY.

Patented Sept. 11, 1951

2,567,484

UNITED STATES PATENT OFFICE 2,567,484

INTERCOMMUNICATION TELEPHONE SYSTEM

Edgar Ivens, Stanmore, England, assignor to Modern Telephone Corporation, New York, N. Y., a corporation of New York Application October 19, 1949, Serial No. 122,200
In Great Britain September 16, 1949

15 Claims. (Cl. 179—1)

This invention relates to new and useful improvements in telephone intercommunicating systems and more particularly to systems of the type in which two or more stations may use a common amplifier.

One of the objects of the invention is to provide an arrangement whereby a substation as well as the main or master station of an intercommunicating system may control the switching of the amplifier into the circuit so as to allow conversation in either direction. In accordance with the preferred embodiment of the invention as herein disclosed, normally the master station need not employ its amplifier switching key, the so-called talk-listen key; the substation with which the master station had established connection can perform that operation by actuating the talk-listen key provided thereat. However, means are provided at the master station whereby the control of the amplifier switching can be taken over by the latter and the substation disabled from affecting the switching.

Another object of the invention deals with signaling between the stations. In accordance with a feature of the invention signaling is accomplished under the control of the same talk-listen key at the substation that is used for controlling the switching of the amplifier. Two forms of signals may be provided at the master station; a visual signal individual for each substation and an audible signal common to all the substations. The visual signal of a substation is lighted whenever the substation desires to be connected with the master station. The audible signal in accordance with a feature of the invention is operated only when any one of the substations desires to be connected with the master station and the latter is not engaged in conversation, thus preventing annoying disturbance.

These and other features of the invention will more clearly appear from the appended claims and the description of a preferred embodiment of the invention, the essential elements of which are diagrammatically illustrated in the drawing.

All the equipment indicated in the drawing is located at a master station except for what is shown within the dotted rectangle, which is at a substation. Two substations are illustrated, only one of which shows the details therein, but, of course, several substations like those shown may be connected to the selector switch contacts at the main station.

A telephone loudspeaker 10 which may be used both as a receiver and a microphone or transmitter is located at the main station and a similar loudspeaker 11 is located at each substation. The main station is provided with an amplifier 12 of any suitable design. The input and output terminals of the amplifier are connected with armatures 13*a*, 13*b*, 13*c* and 13*d* of a relay 13 provided at the main station. The relay armatures cooperate with the customary make and break or front and back contacts.

The main station is provided with a selector switch or key for each substation. The drawing illustrates three such switches, 14, 15 and 16, each with four movable contact making members or blades *a*, *b*, *c*, *d*, cooperating with make and break contacts.

A visual signal is provided at the master station for each substation and a single audible signal is also provided at the master station. The visual signals are lamps 17, 18 and 19 and the audible signal is buzzer 20. The operation of the audible signal is controlled by a relay 21 at the master station via its armature and make contact 21*a*.

The master station is connected with each substation by a line consisting of three metallic conductors, two for talking and one for signaling. The talking conductors leading from the master station to the substation illustrated are 22, 23 and the signaling conductor is 24.

The master station is further equipped with a separate switch 25 which through a break contact controls one circuit for operating relay 13, and a key 26 used as a listen-talk key and controlling through a make contact another circuit of relay 13. Each substation is equipped with a combined signaling and talk-listen key 27 by means of which it may control the signaling of the master station or the operation of relay 13 and thus the connection of the circuits to the input or output side of the amplifier 12.

At each substation there may be further provided a resistor 28 which through switch 29 may be connected in shunt across the voice coil 30 of the loudspeaker.

The operation of the system is as follows:

Assuming that the master station desires to call the substation illustrated, the key 16 will be depressed moving the contact blades 16*a* to *d* from the position shown into engagement with the make contacts. A talking circuit will thus be completed between the master station and the substation which may be traced as follows: From the loudspeaker 10, break contact and relay armature 13*a*, and one input terminal of amplifier 12. The other input terminal is connected to the loudspeaker 10 via relay armature 13b and a normally closed break or back contact. The output of the amplifier is connected via relay armatures 13c and 13d and the break contacts with which these armatures are normally in engagement, to wires 31 and 32. The wire 31 is multipled to the make contacts of switch blade 16a and the corresponding blades 15a and 14a of all other substation selecting switches. Similarly, the wire 32 is multipled to make contacts of selector switch blade 16b and corresponding blades of the other substation selector switches. Since only switch 16 has been operated, the talking circuit will be completed via conductors 22 and 23 to the loudspeaker 11 at the selected substation. Assuming that the amplifier 12 and all the other equipment are energized from suitable sources of power, the master station will be able to speak to the selected substation and the output of the loudspeaker employed as a microphone will be amplified by the amplifier 12 and transmitted to the loudspeaker 11 at the substation which will be operated as a receiver. This was accomplished simply by depressing the key 16.

The substation answers the call by depressing the key 27 and holding it depressed while talking. This will complete a circuit from the negative pole of a suitable source of power, e. g. a battery 33, over the winding of relay 13, the normally closed break contact and switch 25, the normally open but now closed make contact of switch blade 16d, the signaling conductor 24, the make contact of key 27, talking conductor 23, the normally open but now closed make contact of switch blade 16b, wire 32, and the positive pole of battery 33. The relay 13 will be energized and by attracting its armatures will reverse the connections to the input and output terminals of amplifier 12 as far as the two stations are concerned, so that the master station 10 will be connected to the output terminals of the amplifier via relay armatures 13c and d and the make contacts of the relay, and the substation will be connected with the input via talking wires 22, 23, switch blades 16a and b, and the make contacts with which they are now in engagement, wires 31 and 32 and make contacts and armatures 13a and 13b of relay 13. Thus the substation 11 may now speak and the speech will be amplified and heard at the master station 10.

When the substation releases key 27 the relays 13 will again become deenergized and reestablish the connections as it existed previously so that the master station may now speak.

When the master station wishes to terminate the connection switch 16 is restored to the normal condition shown in the drawing.

If the substation wishes to initiate a call, the key 27 is depressed. Since the switch 16 is in its normal position, a circuit will be closed from the negative pole of battery 33, a normally closed break contact and switch blade 16d, signaling conductor 24, key 27, talking conductor 23, switch blade 16b and the break contact with which it is normally in engagement, lamp 19, and the winding of relay 21 to the positive pole of battery 33. The lamp 19 will light, and through its armature and make contact 21a, relay 21 will close an energizing circuit for a buzzer 20 which includes in series normally closed break contacts of all the three selector switches 14, 15 and 16.

Similarly, when the other substations call by operating their key corresponding to 27, then the calling lamp 17 or 18 is operated and the relay 21 which is connected in multiple through the three calling lamps will close the circuit of the buzzer 20.

When the master station acknowledges a call by depressing the key 14, 15 or 16 corresponding to the calling station, the circuit of the lighted lamp and of relay 21 will be interrupted in the break contact of the actuated key, e. g. the break contact cooperating with 16b. The lamp becomes extinguished and the relay 21 opens the circuit of the buzzer 20. The buzzer circuit will be opened also in the break contact of the actuated key, e. g. 16C. The contact d of the actuated selector key, e. g. 16d, switches the signaling wire 24 into the position in which via relay 13 it controls the switching of the talking wires alternately to the input or output sides of the amplifier 12.

If a substation initiates a call while the master station is connected with another substation, then the lamp 17, 18 or 19 representing the calling station will be lighted over the circuit previously traced. However, the buzzer 20 will not operate because although the relay 21 will be energized, the buzzer circuit will be open in the break contact of the depressed key. If, for instance, the master station is connected with the substation shown in the drawing, and a substation attempts to call whose signaling wire 24a is connected with switch blade 15d of the key 15, then the circuit will be closed from the negative pole of battery 33 via the conductor 24a, the key corresponding to 27 at the calling substation, one of the talking conductors 23a of the calling substation, switch blade 15b of key 15, lamp 18, winding of relay 21 to the positive pole of the battery. The lamp 18 will be lighted and the relay 21 will be energized but the buzzer 20 will not operate because its circuit is open in the break contact of 16c. The master station noticing the lamp lighted may acknowledge the call by depressing key 15 and talking to the calling party.

If the lamp 18 lights while the key 16 is operated and the master station wishes to interrupt the conversation with the substation shown in the drawing, the switch 25 is operated, the substation notified that the connection will be broken in favor of a new call that is coming in, the key 16 released, and the key 15 depressed.

The master station may at any time disable the calling substation from operating the amplifier switching relay 13 by actuating the separate switch 25. The energization of the relay 13 will then depend solely on the condition of the key 26 at the master station, and thus the master station will determine whether his loudspeaker 10 be connected with the input or output side of the amplifier 12 and whether the lines leading to the substations be connected to the output or input side of the amplifier.

By opening the switch 25, depressing one or more of the keys 14, 15 and 16, and then operating the key 26, the master station may listen to any one of the substations or to all the substations and may speak at will to any or all substations.

In order to reduce the sensitivity of loudspeakers like 11 at the substations, e. g. to prevent eavesdropping, the resistor 28 is normally shunted across the speaker, thus mismatching the voice coil 30 with respect to the output of amplifier 12. If switch 29 is open, then the impedance of coil 30 will be matched to the output impedance of the amplifier and will respond with full power.

What I claim is:

1. In a telephone intercommunicating system, a plurality of stations, an amplifier having an input and an output, a line leading from one station to another, each line having at least two conductors, a station selector switch and a relay at one station, a key at each station, contacts controlled by said relay for connecting said one station alternately with the amplifier input and output, contacts controlled by said relay for alternately connecting the amplifier output and input with one conductor leading to the other station, a circuit for said relay controlled by the key at said one station, and a second circuit for said relay controlled by the key at the other station via the other conductor.

2. In a telephone intercommunicating system, a plurality of stations, an amplifier having an input and an output, a line leading from one station to another, each line having at least one talking and a signaling conductor, a station selector switch and a relay at one station, a key at each station, contacts controlled by said relay for connecting said one station alternately with the amplifier input and output, contacts controlled by said relay for alternately connecting the amplifier output and input with the talking conductor leading to the other station, a circuit for said relay controlled by the key at said one station, and a second circuit for said relay controlled by the key at the other station via the signaling conductor leading thereto.

3. The system according to claim 2, in which each line comprises two talking conductors, contacts controlled by the selector switch and contacts controlled by the relay in both talking conductors.

4. The system according to claim 1, and a separate switch at said one station controlling the second circuit of said relay.

5. The system according to claim 1, and in which said one station is a master station and a plurality of stations are substations, and in which the second circuit of said relay includes contacts controlled by said selector switch.

6. The system according to claim 5, and a separate switch at the master station for controlling the second circuit of said relay.

7. The telephone intercommunicating system according to claim 2, and in which said one station is a master station and the other a substation, a signal for the substation at the master station, a circuit for the signals controlled by the key at the substation via the talking conductor.

8. The system according to claim 7, and contacts controlled by the selector switch in the circuit for the signals.

9. The system according to claim 7, a second signal at the master station common to all substations, a circuit for the second signal controlled by a key at any substation, and contacts in the last mentioned circuit controlled by the station selector switch.

10. In a telephone intercommunicating system, a source of current, a master station and a plurality of substations, an amplifier having an input and an output, a line leading from the master station to each substation, each line having two talking and a signaling conductor, a selector switch at the master station for each substation, a separate switch and a relay at the master station, a signal for each substation at the master station, a key at each station, contacts controlled by the relay for connecting the master station with the amplifier input, contacts controlled by the relay for connecting the master station with the amplifier output, contacts controlled by the relay for connecting the amplifier output and contacts controlled by the relay for connecting the amplifier input in multiple across two talking conductors leading to each substation via contacts of the selector switches for the substations, a circuit for said relay controlled by the key at the master station, a circuit for said relay controlled in multiple by contacts of the selector switches in one of the talking conductors leading to the substations, and then in series the key at any substation, the signaling conductor from the substation to the master station, a contact controlled by the selector switch representing the substation and a contact controlled by said separate switch, and a circuit for the signals controlled in contacts of the selector switches in each talking conductor and thence in series the key at any substation, the signaling conductor leading from the latter and a contact controlled by the corresponding selector switch.

11. The telephone intercommunicating system according to claim 10, a signal for each substation at the master station, and a circuit for the signals controlled by the key at any substation via the signaling conductor leading from the latter.

12. The system according to claim 11, and contacts of the selector switches connected in multiple in the circuit for the signals.

13. The system according to claim 10, a signal at the master station, and a circuit for the signal controlled by the key at any substation over a talking conductor.

14. The system according to claim 13, and contacts connected in series in the circuit of the signal, each contact controlled by a different selector switch.

15. In a telephone intercommunicating system, a source of current, a master station and a plurality of substations, a combined loudspeaker and microphone at each station, an amplifier having an input and an output at the master station, a line leading from the master station to each substation, each line having two talking and a signalling conductor, a selector switch at the master station for each substation, each switch having make and break contacts, a separate switch at the master station having a break contact, a first and a second relay at the master station having make and break contacts, a single audible signal and a visual signal for each substation at the master station, a key at each station, break contacts for the first relay connecting the master station with the amplifier input, make contacts for the first relay connecting the master station with the amplifier output, break contacts for the first relay connecting the amplifier output and make contacts for the first relay connecting the amplifier input in multiple across two talking conductors leading to each substation via make contacts of the selector switches for the substations, an energizing circuit for said relay controlled solely by the key at the master station, an energizing circuit for said relay including in multiple make contacts of the selector switches in one of the talking conductors leading to the substations, and then in series the key at any substation, the signaling conductor from the substation to the master station, a make contact of the switch representing the substation and said separate switch, an energizing circuit for the second relay extending in multiple over the visual signals and over break contacts of the selector switches in each talking conductor and thence in series the key at any substation, the signaling conductor of the latter and a break contact of the corresponding selector switch at the master station, and an energizing circuit for the audible signal including in series a make contact for the second relay and break contacts of all the selector switches.

EDGAR IVENS.

REFERENCES CITED

The following references are of record in the file of this patent:

UNITED STATES PATENTS

| Number | Name | Date |
|---|---|---|
| 2,162,369 | Campbell | June 13, 1939 |
| 2,162,370 | Campbell | June 13, 1939 |
| 2,166,517 | Begun | July 18, 1939 |
| 2,249,456 | Campbell | July 15, 1941 |
| 2,255,517 | Nickerson | Sept. 9, 1941 |
| 2,269,144 | Campbell | Jan. 2, 1942 |
| 2,347,079 | Campbell | Apr. 18, 1944 |